US012755579B2

(12) United States Patent
Javan Roshtkhari et al.

(10) Patent No.: US 12,755,579 B2
(45) Date of Patent: Oct. 6, 2026

(54) SYSTEM AND METHOD FOR GROUP ACTIVITY RECOGNITION IN IMAGES AND VIDEOS WITH SELF-ATTENTION MECHANISMS

(71) Applicant: Sportlogiq Inc., Montreal (CA)

(72) Inventors: Mehrsan Javan Roshtkhari, Beaconsfield (CA); Kirill Gavrilyuk, Amsterdam (NL); Ryan Hartley Sanford, Montreal (CA)

(73) Assignee: Sportlogiq Inc., Montreal (CA)

( * ) Notice: Subject to any disclaimer, the term of this patent is extended or adjusted under 35 U.S.C. 154(b) by 530 days.

(21) Appl. No.: 17/817,454

(22) Filed: Aug. 4, 2022

(65) Prior Publication Data

US 2022/0383639 A1 Dec. 1, 2022

Related U.S. Application Data

(63) Continuation of application No. PCT/CA2021/050391, filed on Mar. 25, 2021.

(Continued)

(51) Int. Cl.
*G06V 40/20* (2022.01)
*G06V 10/774* (2022.01)

(Continued)

(52) U.S. Cl.
CPC ............ *G06V 40/23* (2022.01); *G06V 10/774* (2022.01); *G06V 10/82* (2022.01); *G06V 20/42* (2022.01); *G06V 20/52* (2022.01)

(58) Field of Classification Search
CPC ...... G06V 40/23; G06V 10/774; G06V 10/82; G06V 20/42; G06V 20/52; G06V 10/764;

(Continued)

(56) References Cited

U.S. PATENT DOCUMENTS

2017/0103264 A1* 4/2017 Javan Roshtkhari .. G06V 20/49
2018/0137364 A1* 5/2018 Forouhar ............... G06V 20/44

(Continued)

FOREIGN PATENT DOCUMENTS

CA 2940528 A1 9/2015
EP 3513566 A1 7/2019

OTHER PUBLICATIONS

Qi et al., "stagNet: An Attentive Semantic RNN for Group Activity and Individual Action Recognition", Feb. 2020, IEEE Transactions on Circuits and Systems for Video Technology, vol. 30, No. 2, pp. 549-565 (Year: 2020).*

(Continued)

*Primary Examiner* — Chan S Park
*Assistant Examiner* — Daniel C Chang
(74) *Attorney, Agent, or Firm* — CPST Intellectual Property Inc.; Brett J. Slaney

(57) ABSTRACT

A system and method are described, for automatically analyzing and understanding individual and group activities and interactions. The method includes receiving at least one image from a video of a scene showing one or more individual objects or humans at a given time; applying at least one machine learning or artificial intelligence technique to automatically learn a spatial, temporal or a spatio-temporal informative representation of the image and video content for activity recognition; and identifying and analyzing individual and group activities in the scene.

20 Claims, 11 Drawing Sheets

Related U.S. Application Data

(60) Provisional application No. 63/000,560, filed on Mar. 27, 2020.

(51) Int. Cl.
*G06V 10/82* (2022.01)
*G06V 20/40* (2022.01)
*G06V 20/52* (2022.01)

(58) Field of Classification Search
CPC ...... G06V 40/103; G06N 3/045; G06N 3/044; G06N 3/08
See application file for complete search history.

(56) References Cited

U.S. PATENT DOCUMENTS

| | | | | |
|---|---|---|---|---|
| 2021/0073525 | A1* | 3/2021 | Weinzaepfel | G06V 10/82 |
| 2023/0008567 | A1* | 1/2023 | Zikos | G06T 7/292 |
| 2023/0377336 | A1* | 11/2023 | Kim | G06F 16/7837 |
| 2024/0087316 | A1* | 3/2024 | Chan | G06V 20/42 |

OTHER PUBLICATIONS

Supplemental Euroean Search Report issued in related EP Application No. 21776590; dated Dec. 18, 2023.
Chen Hsing-Yu et al: "Group Activity Recognition via Computing Human Pose Motion History and Collective Map from Video", Feb. 23, 2020, Topics in Cryptology—CT-RSE 2020: The Cryptographers' Track at the RSA Conference 2020, San Francisco, CA, USA, Feb. 24-28, 2020, Cornell University Library, 201 Olin Library Cornel University Ithaca, NY 14853, pp. 705-718, XP047536352.
Qi, Mengshi et al: "Sports Video Captioning via Attentive Motion Representation and Group Relationship Modeling", IEE Transactions on Circuits and Sypstems For Video Techology, IEEE, USA, vol. 30, No. 8, Jun. 6, 2019, pp. 2617-2633, XP011803205.
Qi, Mengshi et al.; stagNet: An Attentive Semantic RNN for Group Activity Recognition Oct. 6, 2018; 18th International Conference, Austin TX, U.S.A., Sep. 24-27, 2015; [Lecture Notes in Computer Science; Lect.Notes Computer], Springer, Berlin, Heidelberg, pp. 104-120, XP047488370.
Qi, Mengshi et al.; stagNet: An Attentive Semantic RNN for Group Activity Recognition: 15th European Conference, Munich, Germany, Sep. 8-14, 2018, Proceedings, Part X.
Wo, Jianchao et al.; Learning actor relation graphs for group activity recognition; Computer Science 2019 IEEE/CVF Conference on Computer Vision and Pattern Recognition (CVPR) Apr. 23, 2019.
Ibrahim, Mostafa S. et al.; A hierarchical deep temporal model for group activity recognition; 2016 IEEE Conference on Computer Vision and Pattern Recognition (CVPR), 2016, pp. 1971-1980, doi: 10.1109/CVPR.2016.217.
Karpathy, Andrej et al.; Large-scale video classification with convolutional neural networks; 2014 IEEE Conference on Computer Vision and Pattern Recognition, 2014, pp. 1725-1732, doi: 10.1109/CVPR.2014.223.
Li, Zhenyang et al., Videolstm convolves, attends and flows for action recognition. Computer Vision and Image Understanding, vol. 166: pp. 41-50, Jan. 2018.
Carreira, João et al.; Quo vadis, action recognition? a new model and the kinetics dataset; 2017 IEEE Conference on Computer Vision and Pattern Recognition (CVPR), 2017, pp. 4724-4733, doi: 10.1109/CVPR.2017.502.
Girdhar, Rohit, and Deva Ramanan. "Attentional pooling for action recognition." Advances in neural information processing systems 30 (2017).
Wang, Xiaolang et al.; Videos as space-time region graphs; Computer Vision—ECCV 2018. ECCV 2018. Lecture Notes in Computer Science(), vol. 11209. Springer, Cham. https://doi.org/10.1007/978-3-030-01228-1_25.
Jhuang, Huehan et al.; Towards understanding action recognition; Proceedings of the IEEE International Conference on Computer Vision (ICCV), 2013, pp. 3192-3199.
Du, Yong et al.; Hierarchical recurrent neural network for skeleton based action recognition; 2015 IEEE Conference on Computer Vision and Pattern Recognition (CVPR).
Chéron, Guilhem et al.; Hierarchical recurrent neural network for skeleton based action recognition; Proceedings of the IEEE conference on computer vision and pattern recognition. 2015.
Du, Wenbin et al.; Rpan: An end-to-end recurrent pose-attention network for action recognition in videos. In ICCV, 2017.
Lan, Tian et al.; Discriminative latent models for recognizing contextual group activities. IEEE Transactions on Pattern Analysis and Machine Intelligence, vol. 34:pp. 1549-1562, 2012.
Deng, Zhiwei et al.; Structure inference machines: Recurrent neural networks for analyzing relations in group activity recognition; 2016 IEEE Conference on Computer Vision and Pattern Recognition (CVPR).
Sun, Ke et al.; Deep high-resolution representation learning for human pose estimation; 2019 IEEE/CVF Conference on Computer Vision and Pattern Recognition (CVPR); pp. 5686-5696.
Choi, Wongun et al.; What are they doing? : Collective activity classification using spatio-temporal relationship among people. Computer Vision Workshops (ICCV Workshops), 2009 IEEE 12th International; pp. 1282-1289.
International Search Reporting issued in corresponding PCT Application No. PCT/CA2021/050391; dated May 31, 2021.

* cited by examiner

| Method | Static | Dynamic | |
|---|---|---|---|
| | Pose | RGB | Flow |
| Baseline | 89.9 | 89.0 | 87.8 |
| Self-Attention Mechanism | 92.3 | 91.4 | 91.5 |

FIG. 7

| Method | Pose + RGB | Pose + Flow |
|---|---|---|
| Early Fusion- summation | 91.2 | 88.5 |
| Early Fusion- concatenation | 91.8 | 89.7 |
| Late Fusion | 93.5 | 94.4 |

FIG. 8

| Method | Group Activity Recognition Accuracy | Individual Activity Recognition Accuracy |
|---|---|---|
| Ibrahim *et al.* [3] | 81.9 | - |
| Wu *et al.* [2] | 92.5 | 83.0 |
| Qi *et al.* [1] | 89.3 | - |
| Self-Attention Mechanism (RGB + Flow) | 93.0 | 83.7 |
| Self-Attention Mechanism (Pose + RGB) | 93.5 | 85.7 |
| Self-Attention Mechanism (Pose + Flow) | **94.4** | **85.9** |

FIG. 9

| Method | Group Activity Recognition Accuracy |
|---|---|
| Lan *et al.* [13] | 79.7 |
| Deng *et al.* [14] | 81.2 |
| Ibrahim *et al.* [3] | 81.5 |
| Wu *et al.* [2] | 91.0 |
| Qi *et al.* [1] | 89.1 |
| Self-Attention Mechanism (RGB + Flow) | **92.8** |
| Self-Attention Mechanism (Pose + RGB) | 91.0 |
| Self-Attention Mechanism (Pose + Flow) | 91.2 |

FIG. 10

| | | | | | | | | |
|---|---|---|---|---|---|---|---|---|
| right set | 90.6 | 2.1 | 5.7 | 0.0 | 1.0 | 0.5 | 0.0 | 0.0 |
| right spike | 2.3 | 94.8 | 1.2 | 0.6 | 0.0 | 0.6 | 0.6 | 0.0 |
| right pass | 1.4 | 0.5 | 97.1 | 0.0 | 0.0 | 0.0 | 0.5 | 0.5 |
| right winpoint | 0.0 | 0.0 | 0.0 | 92.0 | 0.0 | 0.0 | 0.0 | 8.0 |
| left set | 0.6 | 0.6 | 0.0 | 0.0 | 94.0 | 1.2 | 3.0 | 0.6 |
| left spike | 0.6 | 1.1 | 0.0 | 0.0 | 2.8 | 94.4 | 1.1 | 0.0 |
| left pass | 0.0 | 1.3 | 2.2 | 0.0 | 0.9 | 0.0 | 95.6 | 0.0 |
| left winpoint | 0.0 | 0.0 | 0.0 | 4.9 | 0.0 | 0.0 | 0.0 | 95.1 |

FIG. 12

SYSTEM AND METHOD FOR GROUP ACTIVITY RECOGNITION IN IMAGES AND VIDEOS WITH SELF-ATTENTION MECHANISMS

CROSS-REFERENCE TO RELATED APPLICATION(S)

This application is a Continuation of PCT Application No. PCT/CA2021/050391 filed on Mar. 25, 2021, which claims priority to U.S. Provisional Patent Application No. 63/000,560 filed on Mar. 27, 2020, the entire contents of which are incorporated herein by reference.

TECHNICAL FIELD

The following generally relates to systems and methods for video and image processing for activity and event recognition, in particular to group activity recognition in images and videos with self-attention mechanisms.

BACKGROUND

Group activity detection and recognition from visual data such as images and videos involves identifying what an entity (e.g., a person) does in a group of entities (e.g., people) and what the group is doing as a whole. As an example, in a sport game such as volleyball, an individual player may jump, while the group is performing a spike. Besides sports, such group activity recognition has several applications including crowd monitoring, surveillance, and human behavior analysis. Common tactics to recognize group activities exploit representations that model spatial graph relations between individual entities (e.g., references [1, 2]) and follow those entities and their movements over time (e.g., references [1, 3]). It has been found to be common in the prior art to explicitly model these spatial and temporal relationships based on the location of the entities, which requires to either explicitly define or use a pre-defined structure for groups of entities in a scene to model and recognize group activities.

In the prior art, many action recognition techniques are based on a holistic approach, thereby learning a global feature representation of the image or video by explicitly modelling the spatial and temporal relationship between people and objects in the scene. State-of-the-art techniques for image recognition such as Convolutional Neural Networks (CNNs) have been used for action detection and extended from two dimensional images to capture temporal information and account for time in the videos which is vital information for action recognition. Earlier methods rely on extracting features from each video frame using two dimensional (2D) CNNs and then fusing them using different fusion methods to include temporal information—see reference [4]. Some prior art methods have leveraged Long Short-Term Memory neural networks (LSTMs) to model long-term temporal dependencies across frames—see reference [5]. Some work has extended the 2D convolutional filters to three dimensional (3D) filters by using time as the third dimension to extract features from videos for different video analysis tasks—see reference [6].

Several studies explored attention mechanisms for video action recognition by incorporating attention via LSTM models (see reference [5]), pooling methods (see reference [7]) or mathematical graphs models (see reference [8]).

Most of the individual human actions are highly related to the position and motion of the human body joints and the pose of the human body. This has been extensively explored in the literature, including using hand-crafted pose features (see reference [9]), skeleton data (see reference [10]), body joint representation (see reference [11]) and attention guided by pose (see reference [12]). However, these approaches were only designed to recognize an action for one individual actor, which is not applicable to inferring group activities because of the absence of the information about the interactions between the entities in the group.

Prior art methods for group activity recognition often relied on designing and using hand-crafted features to represent the visual data for further analysis, engineered explicitly to extract a characteristic information of each individual in the scene, which were then processed by probabilistic graphical models (see reference [13]) for the final inference. Some of the more recent methods utilized artificial neural networks and more specifically recurrent neural network (RNN)-type networks to infer group activities from extracted image feature or video features—see references [3] and [14].

SUMMARY

Rather than explicitly define and model the spatial and temporal relationships between the entities in the visual data based on the location of the entities to infer individual and group activities, the disclosed method uses an implicit spatio-temporal model which automatically learns the spatial and temporal configuration of the groups of entities (e.g., humans) from the visual data, using the visual appearance and spatial attributes of the entities (e.g. body skeleton or body pose information for humans) for recognizing group activities. The learning is done by applying machine learning and artificial intelligence techniques on the visual data, to extract spatial, temporal, and spatio-temporal information characterizing content of the visual data, also known as visual features. Visual features are numerical representations of the visual content, often coded as a vector of numbers. In this document the terms "numerical representation" and "features" are used interchangeably.

The following also discloses individual and group activity detection methods using visual data to detect and recognize the activity of an individual and the group that it belongs to. The methods are based on the learning appearance characteristics using machine learning and artificial intelligence techniques from the images in the videos and spatial attributes of the entities and persons to selectively extract information relevant for individual and group activity recognition.

In an aspect, the following discloses a method for group and individual activity recognition from video data which is able to jointly use pixel level video data, motion information and the skeletal shape of the people and their spatial attributes in the scene that model both static and dynamic representations of each individual subject (person) to automatically learn to recognize and localize the individual and group actions and the key actor in the scene. The method uses a self-attentions mechanism that learns and selectively extracts the important representative feature for individual and group activities and learns to construct a model to understand and represent the relationship and interactions between multiple people and objects in a group setting. Those extracted representative feature are represented by numerical values, which can further be used to recognize and detect individual and group activities.

As understood herein, a self-attention mechanism models dependencies and relations between individuals in the scene or referred to them here as actors and combines actor-level information for group activity recognition via a learning mechanism. Therefore, it does not require explicit and pre-defined spatial and temporal constraints to model those relationships.

Although certain aspects of the disclosed methods are related to the group and individual activity recognition involving people and objects, the systems and methods described herein can be used for activity recognition involving only objects without people, such as traffic monitoring as long as the objects have some representative static and dynamic features and there is spatial and temporal structure in the scene between the objects.

In one aspect, there is provided a method for processing visual data for individual and group activities and interactions, the method comprising: receiving at least one image from a video of a scene showing one or more entities at a corresponding time; using a training set comprising at least one labeled individual or group activity; and applying at least one machine learning or artificial intelligence technique to learn from the training set to represent spatial, temporal or spatio-temporal content of the visual data and numerically model the visual data by assigning numerical representations.

In an implementation, the method further includes applying learnt machine learning and artificial models to the visual data; identifying individual and group activities by analyzing the numerical representation assigned to the spatial, temporal, or spatio-temporal content of the visual data; and outputting at least one label to categorize an individual or a group activity in the visual data.

In other aspects, systems, devices, and computer readable medium configured to perform the above method are also provided.

BRIEF DESCRIPTION OF THE DRAWINGS

Embodiments will now be described with reference to the appended drawings wherein:

FIG. 7 illustrates a comparison of the self-attention mechanism with baselines on different modalities.

FIG. 8 illustrates a comparison of different information fusion strategy of different modalities with self-attention mechanism.

FIG. 9 illustrates the volleyball dataset comparison for individual action prediction and group activity recognition with state-of-the-art methods.

FIG. 10 illustrates the collective dataset comparison for and group activity recognition with state-of-the-art methods.

FIG. 12 illustrates a volleyball dataset confusion matrix for group activity recognition, showing the present method achieving over 90% accuracy for each group activity.

DETAILED DESCRIPTION

An exemplary embodiment of the presently described system takes a visual input such as an image or video of a scene with multiple entities including individuals and objects to detect, recognize, identify, categorize, label, analyze and understand the individual actions, the group activities, and the key individual or entity that either makes the most important action in the group or carries out a main action characterizing the group activity which is referred to as the “key actor”. The individual actions and group activities include human actions, human-human interactions, human-object interactions, or object-object interactions.

In the exemplary embodiment, a set of labeled videos or images containing at least one image or video of at least one individual or group activity is used as the “training set” to train machine learning algorithms. Given the training set, machine learning algorithms learn to process the visual data for individual and group activities and interactions by generating a numerical representation of spatial, temporal or spatio-temporal content of the visual data. The numerical representation which sometimes refer to as “visual features” or “features” are either explicitly representing the labels and categories for the individual and group activities, or implicitly representing them to be used for further processing. After the training, the learnt models process an input image or video to generate the numerical representation of the visual content.

Figure 1:
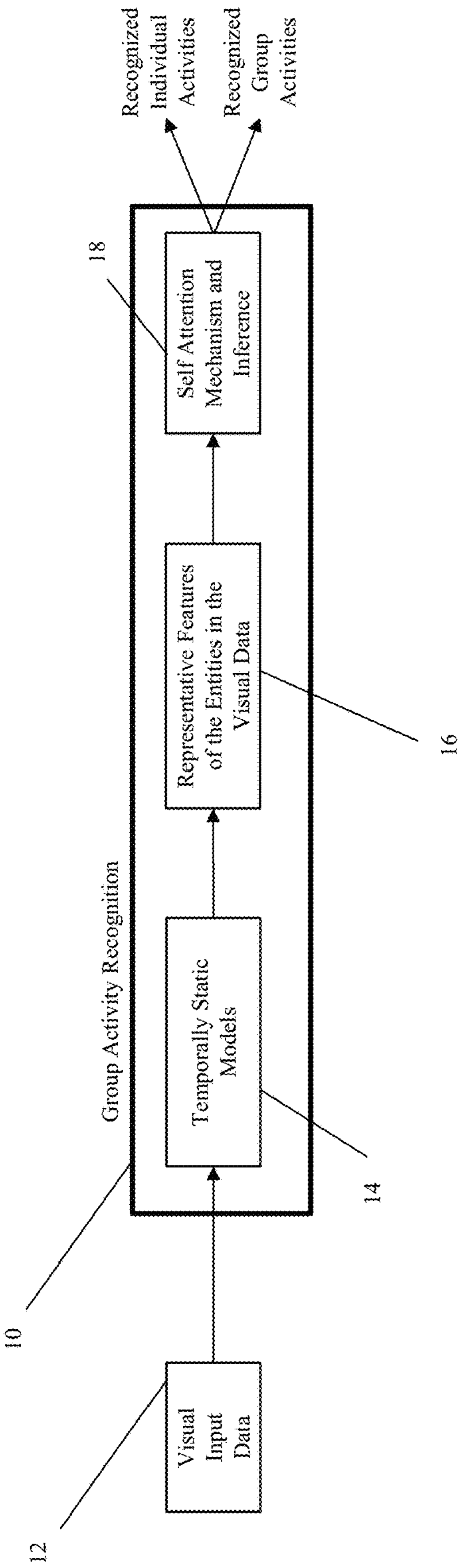
FIG. 1 depicts a schematic block diagram of a module or device for individual and group activity recognition from a visual input data.

Referring to the drawings, FIG. 1 depicts a schematic block diagram of a module or device for individual and group activity recognition 10 from a visual input data 12 that can be a single image, or a sequence of images, showing a scene where humans and objects can be present. The group activity includes all the actions and interactions between all the humans and objects in the scene and describes what the whole group is doing collectively. Individual activities are labeled describing what each individual person or object is doing in the scene. One or more temporally static models 14 are applied to the visual input data 12 to extract relevant spatial information without using a time aspect in the input data 12 and transfer them into a set of representative features 16 for each person and object in the scene. The representative feature can be a numerical representation of the visual content in a high dimensional space. The final inference about the individual and group activities are carried out using a learnt self-attention mechanism 18 that automatically learns which features and with person or object are more important to look at in order to make a decision about the group and individual action labels. The three components 14, 16, and 18 can be combined together into one single component that infers the individual and group activities from the video data without a specific breakdown between the self-attention mechanism 18 and temporally static models 14 and representative features 16. For example, one artificial neural network can be used instead of components 14 and 16, or another artificial neural network or any machine learning model can replace 14, 16, and 18 collectively. Further details are provided below.

Figure 2:
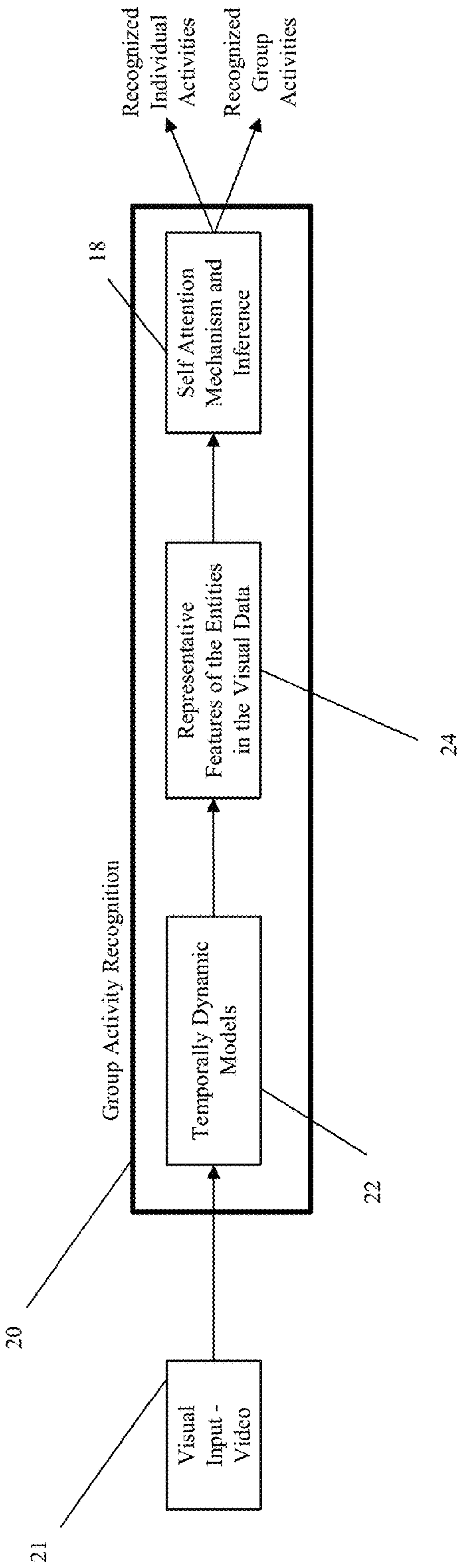
FIG. 2 depicts a schematic block diagram of a module or device for individual and group activity recognition from visual input data in another configuration.

FIG. 2 depicts a schematic block diagram of a module or device for individual and group activity recognition 20 from visual input data 21 that has temporal information such as a video showing a scene where humans and objects can be present. One or more temporally dynamic models 22 in this configuration are applied to the input data 21 to extract relevant spatial and temporal information and transfer them into a set of representative features 24 for each person and object in the scene. The representative feature can be a numerical representation of the visual content in a high dimensional space. The final inference about the individual and group activities are carried out using the learnt self-attention mechanism 18 that automatically learns which features and with person or object are more important to look at in order to make a decision about the group and individual action labels. Similar to the configuration in FIG. 1, the three components 22, 24, and 18 can be combined together.

Figure 3:
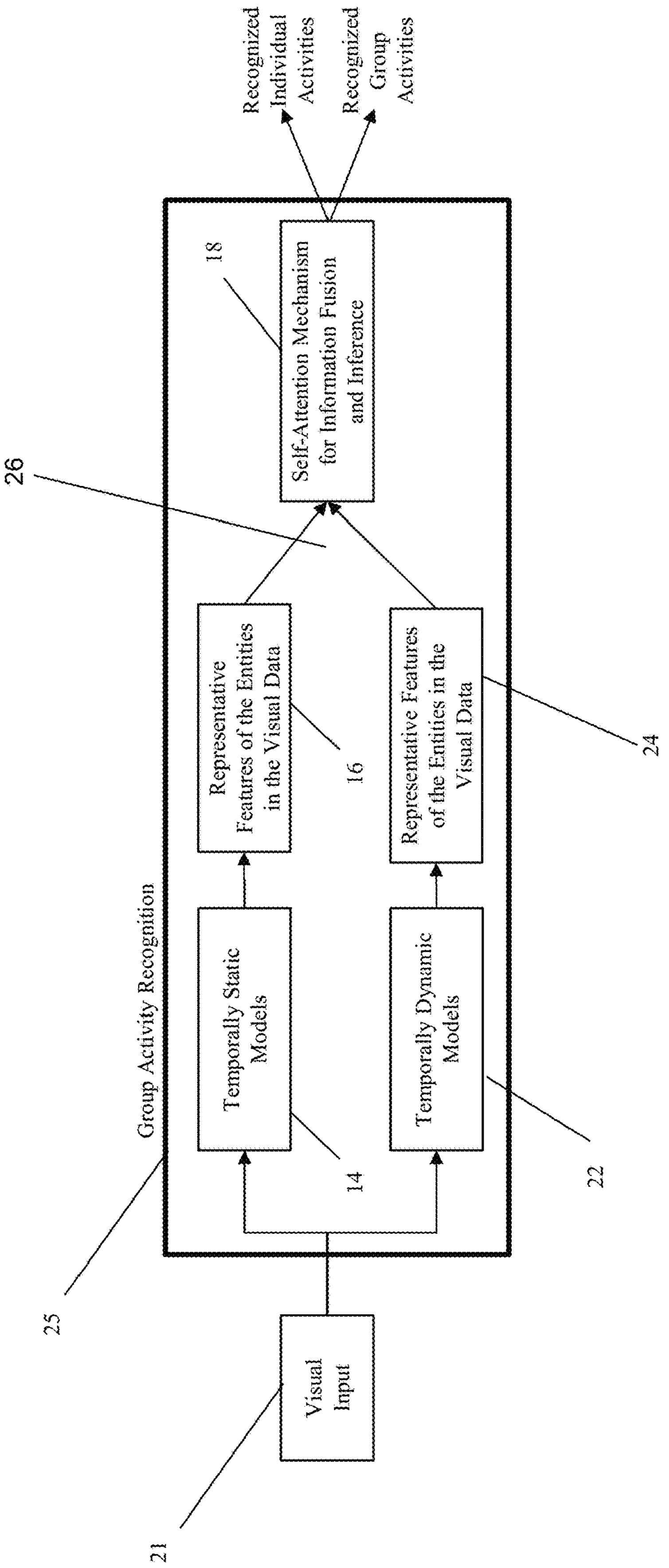
FIG. 3 depicts a schematic block diagram of a module or device for individual and group activity recognition from visual input data in yet another configuration.

FIG. 3 Illustrates a schematic block diagram of a module or device for individual and group activity recognition 25 from visual input data 21 that considers both temporally static and dynamic features (using models 14, 22 and features 16, 24 described above) and combines them together using an information fusion mechanism 26, followed by the self-attention mechanism 18.

Figure 4:
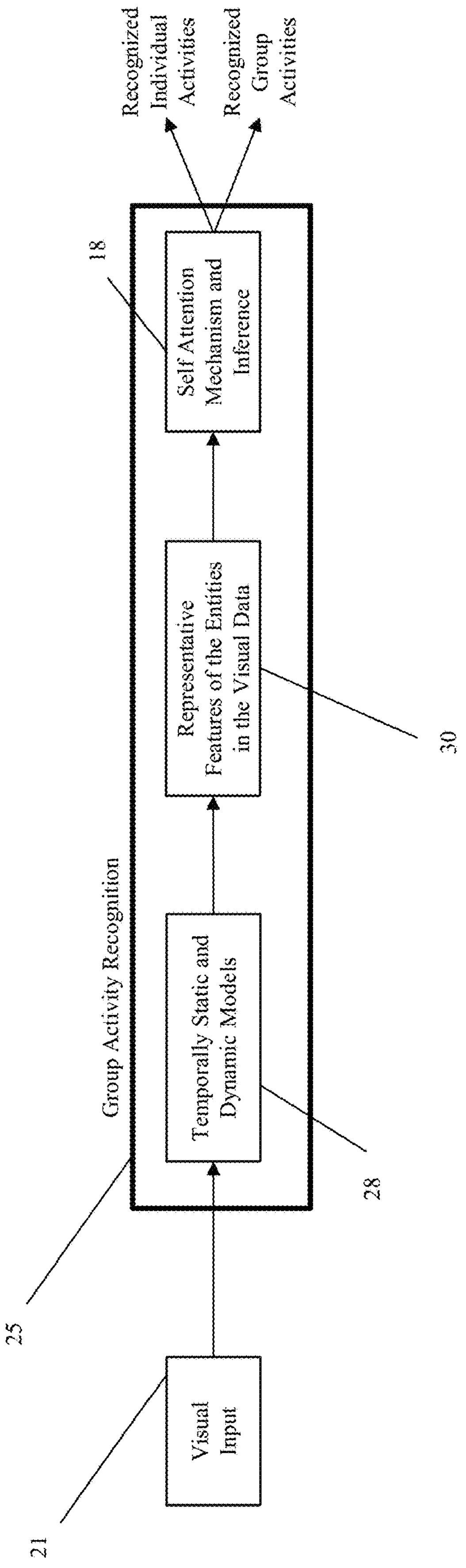
FIG. 4 depicts a schematic block diagram of a module or device for individual and group activity recognition from visual input data in yet another configuration.

FIG. 4 Illustrates a schematic block diagram of a module or device for individual and group activity recognition 25 from visual input data 21 that considers both temporally static and dynamic features (combining both models 14, 22 as a single entity 28) to model both temporally static and dynamic characteristics of the input data and generate features 30 representing information about static and dynamic modalities of input data followed by the self-attention mechanism 18. Similar to the configurations in FIGS. 1 and 2, the components 28, 30, and 18 can be combined together and are not required to be separate entities.

Figure 5:
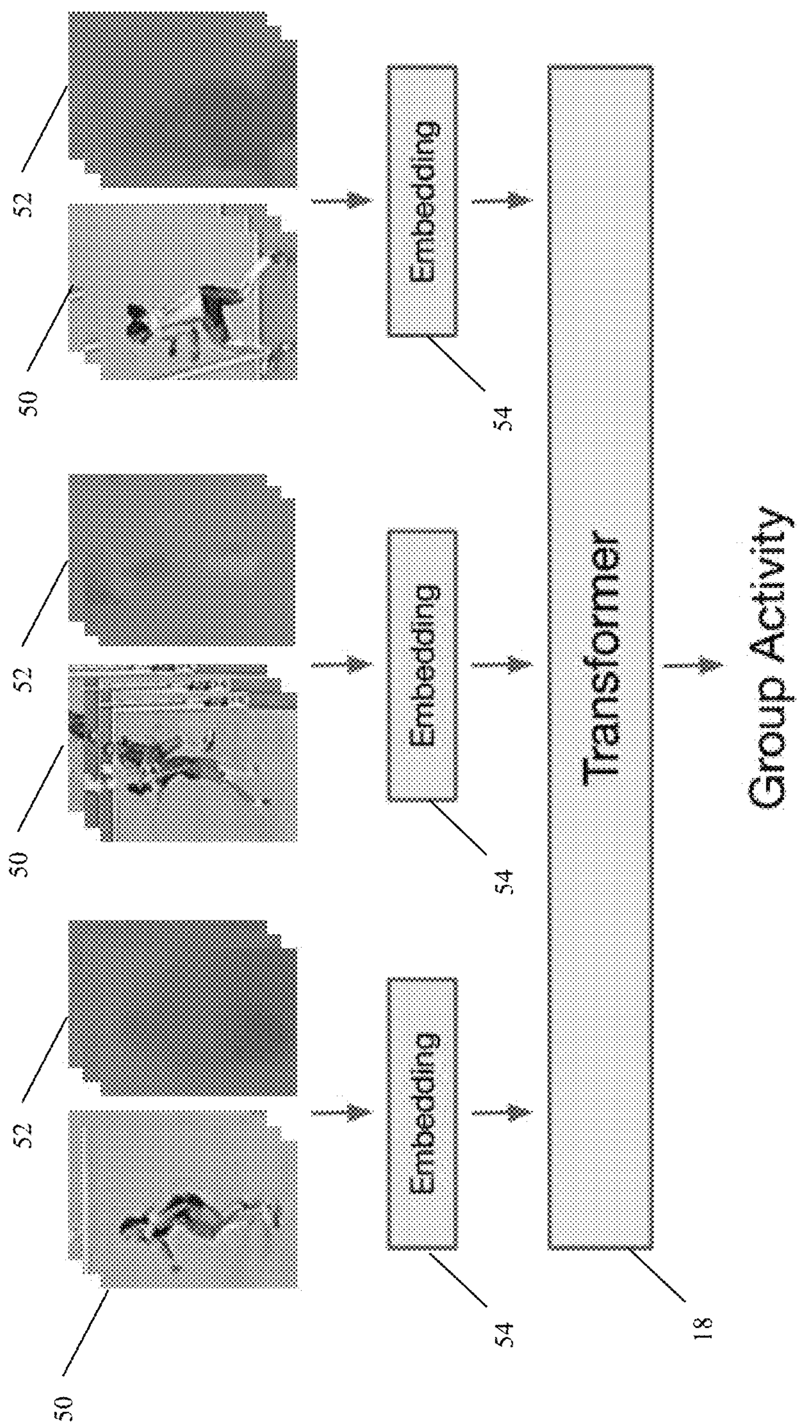
FIG. 5 provides an example of the activity recognition method.

Turning now to FIG. 5, for illustration purposes, an example of the activity recognition method is shown, which takes images of the individual in the scene and extract spatial attributes for the individual, the body pose information 50 as static features and uses optical-flow 52 as dynamic features for each person in the scene. An embedding 54 process is then applied, which includes combining and fusing both static and dynamic features for each person before feeding the fused output to the self-attention inference mechanism 18. The self-attention mechanism 18 can be achieved using transformed networks, but other suitable attention mechanisms can be employed. The static representation can be captured by 2D body pose features from a single frame 50 while the dynamic representation is obtained from multiple image frames or optical flow frames 52.

Further detail of the operation of the configurations shown in FIGS. 3 and 4 will now be provided. In a first example, the following describes how the present method for individual and group activity recognition can be applied in a multi-actor scene using example videos from sporting matches. The enhanced aggregation of the static and dynamic individual actor features can be achieved using self-attentions mechanisms 18. The activity recognition method takes a video from a scene as the input, extracts dynamic and static actor features and group activities and aggregates and fuses the information for final inference.

Figure 6:
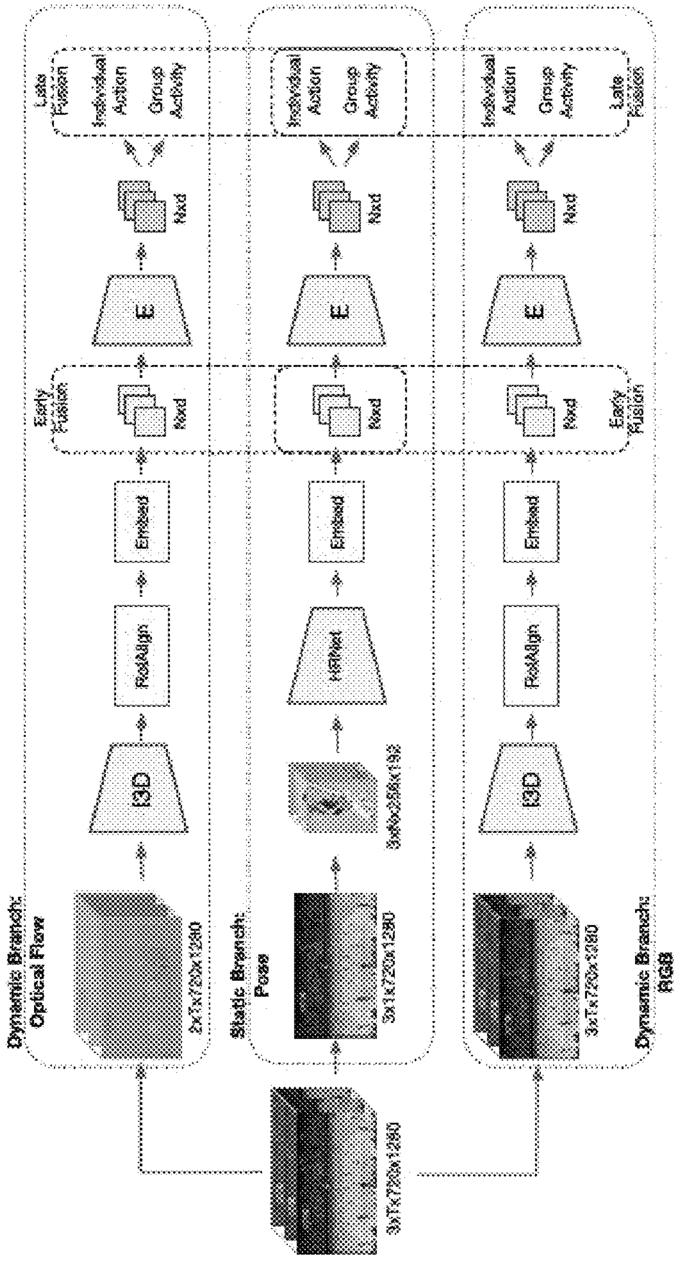
FIG. 6 is an example of a proposed machine learning model for the method.

In an exemplary embodiment, illustrated also in FIG. 6, the input is a sequence of video frames $F_t$, t=1, . . . , T with N actors (people and objects) in each frame where T is the number of frames. One can obtain the static and the dynamic representation of each individual by applying a human pose estimation method to extract human body pose or body skeleton from a single frame or multiple frames to capture spatial attributes of the humans, and a spatio-temporal feature extractor applied on all input frames to generate a numerical representation for the input data. The dynamic numerical representation can be built from frame pixel data or optical flow frames. Then the numerical features representing the humans or actors and objects are embedded into a subspace such that each actor is represented by a high-dimensional numerical vector and then those representations are passed through a self-attention mechanism to obtain the action-level features. These features are then combined and pooled to capture the activity-level features and finally, a classifier can be used to infer individual actions and group activity using the action-level and group activity-level features, respectively.

In this exemplary embodiment, the feature vectors that are representing the appearance and the skeletal structure of the person are obtained by passing images through artificial neural networks. However, any suitable method can be used to extract intermediate features representing the images. Therefore, while examples are provided using artificial neural networks, the principles described herein should not be limited thereto.

Actor Feature Extractor

All human actions involve the motion of body joints, such as hands and legs. This applies not only to fine-grained actions that are performed in sports activities, e.g., spike and set in a volleyball game, but also to every day actions such as walking and talking. This means that it is important to capture not only the position of joints but their temporal dynamics as well. For this purpose, one can use both position and motion of individual body joints and actors themselves.

To obtain joint positions, a pose estimation model can be applied. This model receives as an input, a bounding box around the actor, and predicts the location of key joints. This embodiment does not rely on a particular choice of pose estimation model. For example, state-of-the art body pose estimation such as HRNet can be used—see reference [15]. One can use the features from the last layer of the pose estimation neural network, right before the final classification layer. To extract the temporal dynamics of each actor and model the motion data from the video frames, state-of-the art 3D CNNs can be used such as I3D models. The dynamic feature extraction models can be applied on the sequence of the detected body joints across the videos, the raw video pixel data or the optical flow video. The dynamic features are extracted from stacked $F_t$, t=1, . . . , T frames. The RGB pixel data and optical flow representations are considered here, but for those who are skilled in computer vision the dynamic features can be extracted from multiple different sources using different techniques. The dynamic feature extractors can either be applied on the whole video frame or only the spatio-temporal region that an actor or an entity of interest is present.

Self-Attention Mechanism

Transformer networks can learn and select important information for a specific task. A transformer network includes two main parts, an encoder and a decoder. The encoder receives an input sequence of words (source) that is processed by a stack of identical layers including a multi-head self-attention layer and a fully connected feed-forward network. Then, a decoder generates an output sequence (target) through the representation generated by the encoder. The decoder is built in a similar way as the encoder having access to the encoded sequence. The self-attention mechanism is the vital component of the transformer network, which can also be successfully used to reason about actors' relations and interactions.

Attention A is a function that represents a weighted sum of the values V. The weights are computed by matching a query Q with the set of keys K. The matching function can have different forms, most popular is the scaled dot-product. Formally, attention with the scaled dot-product matching function can be written as:

$$A(Q, K, V) = softmax\left(\frac{QK^T}{\sqrt{d}}\right)V$$

where d is the dimension of both queries and keys. In the self-attention module all three representations (Q, K, V) are computed from the input sequence S via linear projections so $A_h(Q,K,V)=\text{concat}(h_1, \ldots, h_m)W$.

Since attention is a weighted sum of all values, it overcomes the problem of forgetfulness over time. This mechanism gives more importance to the most relevant observations which is a required property for group activity recognition because the system can enhance the information of each actor's features based on the other actors in the scene without any spatial constraints. Multi-head attention $A_h$ is an extension of attention with several parallel attention functions using separate linear projections $h_i$ of (Q, K, V):

$$h_i = A\left(QW_i^Q, KW_i^K, VW_i^V\right)$$

Transformer encoder layer E includes a multi-head attention combined with a feed-forward neural network L:

$$L(X) = \text{Linear}(\text{Dropout}(ReLU(\text{Linear}(X))))$$

$$E(S) = LayerNorm(S + \text{Dropout}(A_h(S)))$$

$$E(S) = LayerNorm(E(S) + \text{Dropout}(L(E(S))))$$

The transformer encoder can contain several of such layers which sequentially process an input S.

S is a set of actors' features $S=\{s_i|i=1, \ldots, N\}$ obtained by actor feature extractors and represented by numerical values. As features $s_i$ do not follow any particular order, the self-attention mechanism 18 is a more suitable model than RNN and CNN for refinement and aggregation of these features. An alternative approach can be incorporating a graph representation. However, the graph representation requires explicit modeling of connections between nodes through appearance and position relations. The transformer encoder mitigates this requirement relying solely on the self-attention mechanism 18. The transformer encoder also implicitly models spatial relations between actors via positional encoding of $s_i$. It can be done by representing each bounding box $b_i$ of respective actor's features $s_i$ with its center point $(x_i,y_i)$ and encoding the center point.

It is apparent that using information from different modalities, i.e. static, dynamic, spatial attribute, RGB pixel values, and optical flow modalities; improves the performance of activity recognition methods. In this embodiment several modalities are incorporated for individual and group activity detection, referred to as static and dynamic modalities. The static one is represented by the pose models which captures the static position of body joints or spatial attributes of the entities, while the dynamic one is represented by applying a temporal machine learning video processing technique such I3D on a sequence of images in the video and is responsible for the temporal features of each actor in the scene. As RGB pixel values and optical flow can capture different aspects of motion both of them are used in this embodiment. To fuse static and dynamic modalities two fusion strategies can be used, early fusion of actors' features before the transformer network and late fusion which aggregates the assigned labels to the actions after classification/categorization. Early fusion enables access to both static and dynamic features before inference of group activity. Late fusion separately processes static and dynamic features for group activity recognition and can concentrate on static or dynamic features, separately.

Training Objective

The parameters of all the components, the static and dynamic models, the self-attention mechanism 18 and the fusion mechanism could be either estimated separately or jointly using standard machine learning techniques such as gradient based learning methods that are commonly used for artificial neural networks. In one ideal setting, the whole parameter estimation of those components can be estimated using a standard classification loss function, learnt from a set of available labelled examples. In case of separately learning the parameters of those components, each one can be estimated separately and then the learnt models can be combined together. To estimate all parameters together, neural network models can be trained in an end-to-end fashion to simultaneously predict individual actions of each actor and group activity. For both tasks one can use a standard loss function such as cross-entropy loss and combine two losses in a weighted sum:

$$\mathcal{L} = \lambda_g \mathcal{L}_g(y_g, \tilde{y}_g) + \lambda_a \mathcal{L}_a(y_a, \tilde{y}_a)$$

where $\mathcal{L}_g$, $\mathcal{L}_a$ are cross-entropy losses, $y_g$ and $y_a$ are ground truth labels, $\tilde{y}_g$ and $\tilde{y}_a$ are predictions for group activity and individual actions, respectively. $\lambda_g$ and $\lambda_a$ are scalar weights of two losses.

Experimental Evaluation

Experiments were carried out on publicly available group activity datasets, namely the volleyball dataset (see reference [3]) and the collective dataset (see reference [16]). The results were compared to the state-of-the-art.

For simplicity, the static modality is called "Pose", the dynamic one that uses raw pixel data from video frames is called "RGB", and dynamic one with optical flow frames is called "Flow" in the next several paragraphs.

The volleyball dataset included clips from 55 videos of volleyball games, which are split into two sets: 39 training videos and 16 testing videos. There are 4830 clips in total, 3493 training clips and 1337 clips for testing. Each clip is 41 frames in length. Available annotation includes group activity label, individual players' bounding boxes and their respective actions which are provided only for the middle frame of the clip. This dataset is extended with ground truth bounding boxes for the rest of the frames in clips which are also used in the experimental evaluation. The list of group activity labels contains four main activities (set, spike, pass, win point) which are divided into two subgroups, left and right, having eight group activity labels in total. Each player can perform one of nine individual actions: blocking, digging, falling, jumping, moving, setting, spiking, standing and waiting.

The collective dataset included 44 clips with varying lengths starting from 193 frames to around 1800 frames in each clip. Every 10th frame has the annotation of persons' bounding boxes with one of five individual actions: (crossing, waiting, queueing, walking and talking. The group activity is determined by the action which most people perform in the clip.

For experimental evaluation T=10 frames are used as the input, the frame that is labeled for the activity and group activity as the middle frame, 5 frames before and 4 frames after. During training one frame Ftp from T input frames is randomly sampled for the pose modality to extract relevant body pose features. The group activity recognition accuracy is used as an evaluation metric.

The use of static modality, human body pose, without dynamic modality results in an average accuracy of 91% for group activity recognition on the volleyball dataset. Including the relative position of all the people in the scene, referred to as "positional encoding" increase the accuracy to 92.3%. Therefore, explicitly adding information about actors' positions helps the transformer better reason about this part of the group activity. Using static and dynamic modalities separately without any information fusion, the results on the Volleyball dataset are shown in FIG. 7. A static single frame (pose) and dynamic multiple frames (I3D) models are used as baselines.

The results of combining dynamic and static modalities are presented in FIG. 8 using different fusion strategies. The exemplary fusion strategies can be replaced by any method for information fusion and the disclosed method in not limited to any particular fusion strategy.

Comparison with the state-of-the-art on the volleyball dataset is shown in FIG. 9 and on the collective dataset in FIG. 10. The results show different variations of the disclosed method with late fusion of Pose with RGB (Pose+RGB), Pose with optical flow (Pose+Flow), and RGB with Optical flow (RGB+Flow). All variations that use both static and dynamic modalities surpass the sate-of-the-art with a considerable margin for both group activity and individual action recognition.

The static and dynamic modalities representing individual and group activities are used together to automatically learn the spatio-temporal context of the scene for group activities using a self-attention mechanism. In this particular embodiment, the human body pose is used as the static modality However, any feature extraction technique can be applied on the images to extract other sort of static representations instead of body pose. In addition, the extracted static features from images can be stacked together to be used as the dynamic modality. The same can be applied to the dynamic modality to generate static features. Another key component is the self-attention mechanism 18 to dynamically select the more relevant representative features for activity recognition from each modality. This exemplary embodiment discloses the use of human pose information on one single image as one of the inputs for the method, however various modifications to make use of a sequence of images instead of one image will be apparent to those skilled in the art. For those skilled in the art, a multitude of different feature extractors and optimization loss functions can be used instead of the exemplary ones in the current embodiment. Although the examples are using videos as the input to the model, one single image can be used instead and rather than using static and dynamic modalities, only static modality can be used. In this case, the body pose and the extracted feature from the raw image pixels are both considered as static modalities.

The exemplary methods described herein are used to categorize the visual input and assign appropriate labels to the individual actions and group activities. However, similar techniques can detect those activities in a video sequence, meaning that the time the activities are happening in a video can be also identified as well as the spatial region in the video where they activities are happening. A sample method can be using a moving window on multiple video frames in time, to detect and localize those activities which will be apparent to those skilled in the art.

Analysis

Figure 11:
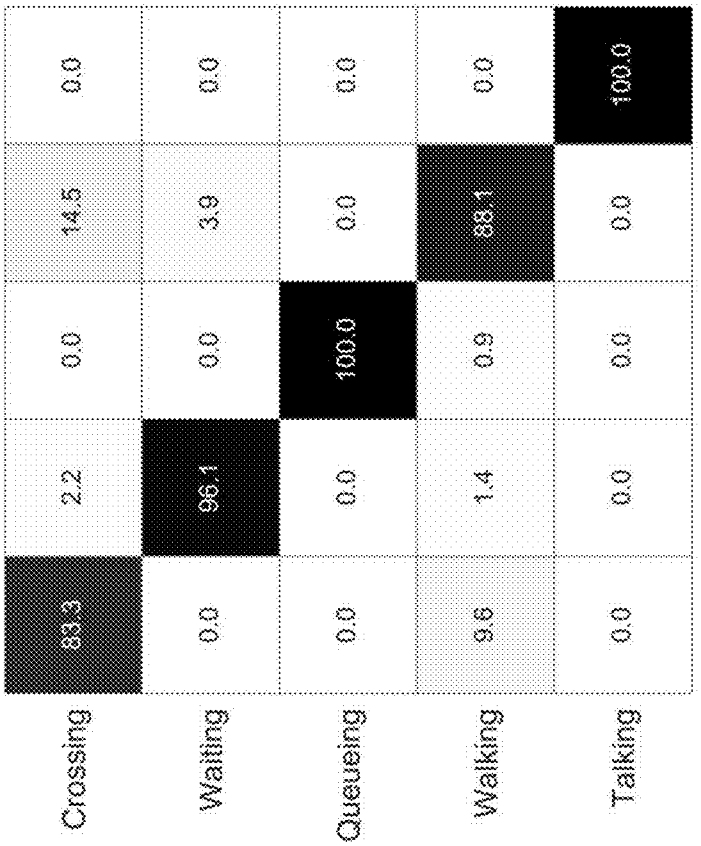
FIG. 11 illustrates a collective dataset confusion matrix for group activity recognition, showing that most confusion comes from distinguishing crossing and walking.

To better understand the performance of the exemplary model one can present confusion matrices for group activity recognition on the volleyball dataset in FIG. 11, and the collective dataset in FIG. 12. For every group activity on the volleyball dataset the present model achieves accuracy over 90% with the least accuracy for right set class (90.6%). The model can make a reasonable prediction even in some failure cases. On the collective dataset, the present approach reaches perfect recognition in this example, for queueing and talking classes.

Figure 13:
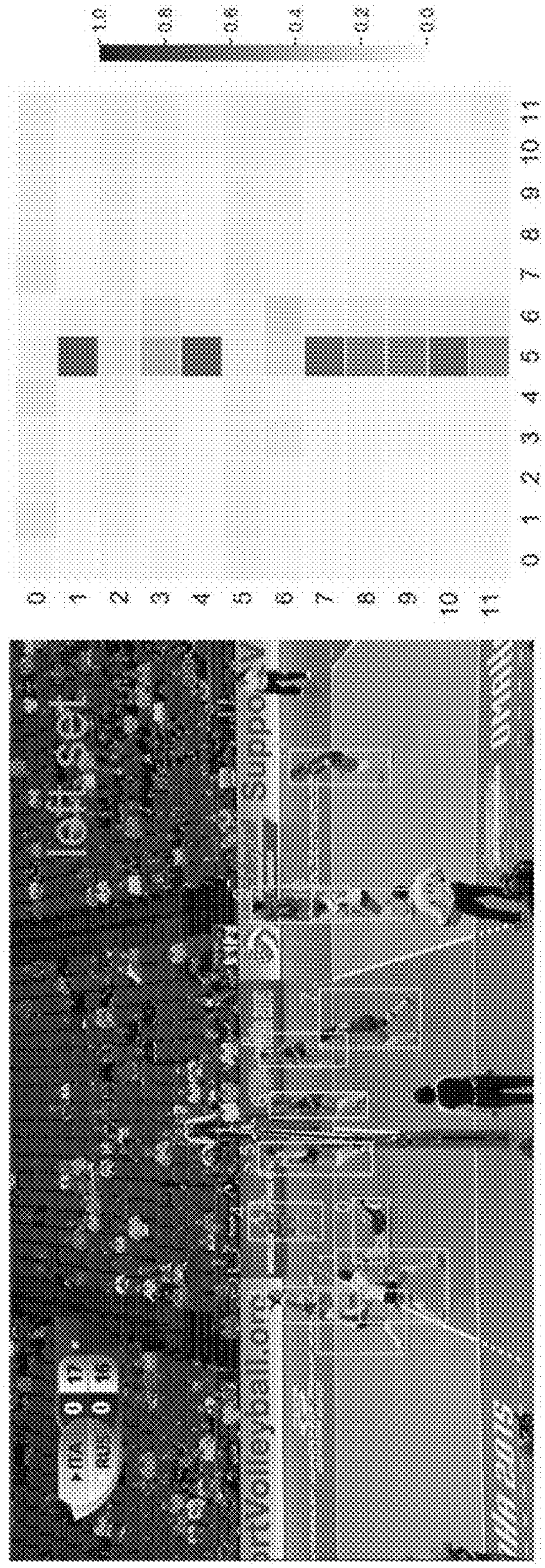
FIG. 13 illustrates an example of each actor attention obtained by the self-attention mechanism.

FIG. 13 shows an example of each actor attention obtained by the self-attention mechanism 18. Most attention is concentrated on the key actor, player number 5 who performs setting action which helps to correctly predict left set group activity. Best viewed in the digital version.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 10, 20, 25, any component of or related to the system 10, 20, 25, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

REFERENCES

1—Mengshi Qi, Jie Qin, Annan Li, Yunhong Wang, Jiebo Luo, and Luc Van Gool. stagnet: An attentive semantic rnn for group activity recognition. In ECCV, 2018.

2—Jianchao Wu, Limin Wang, Li Wang, Jie Guo, and Gangshan Wu. Learning actor relation graphs for group activity recognition. In CVPR, 2019.

3—Mostafa S. Ibrahim, Srikanth Muralidharan, Zhiwei Deng, Arash Vandat, and Greg Mori. A hierarchical deep temporal model for group activity recognition. In CVPR, 2016.

4—Andrej Karpathy, George Toderici, Sanketh Shetty, Thomas Leung, Rahul Sukthankar, and Li Fei-Fei. Large-scale video classification with convolutional neural networks. In CVPR, 2014.

5—Zhenyang Li, Kirill Gavrilyuk, Efstratios Gavves, Mihir Jain, and Cees GM Snoek. Videolstm convolves, attends and flows for action recognition. Computer Vision and Image Understanding, 166:41-50, 2018.

6—João Carreira and Andrew Zisserman. Quo vadis, action recognition? a new model and the kinetics dataset. In CVPR, 2017.

7—Rohit Girdhar and Deva Ramanan. Attentional pooling for action recognition. In NIPS, 2017.

8—Xiaolong Wang and Abhinav Gupta. Videos as space-time region graphs. In ECCV, 2018.

9—Hueihan Jhuang, Juergen Gall, Silvia Zuffi, Cordelia Schmid, and Michael J. Black. Towards understanding action recognition. In ICCV, 2013.

10—Yong Du, Wei Wang, and Liang Wang. Hierarchical recurrent neural network for skeleton based action recognition. In CVPR, 2015.

11—Guilhem Chéron, Ivan Laptev, and Cordelia Schmid. P-cnn: Pose-based cnn features for action recognition. In ICCV, 2015.

12—Wenbin Du, Yali Wang, and Yu Qiao. Rpan: An end-to-end recurrent pose-attention network for action recognition in videos. In ICCV, 2017.

13—Tian Lan, Yang Wang, Weilong Yang, Stephen N. Robinovitch, and Greg Mori. Discriminative latent models for recognizing contextual group activities. IEEE Transactions on Pattern Analysis and Machine Intelligence, 34:1549-1562, 2012.

14—Zhiwei Deng, Arash Vandat, Hexiang Hu, and Greg Mori. Structure inference machines: Recurrent neural networks for analyzing relations in group activity recognition. In CVPR, 2016.

15—Ke Sun, Bin Xiao, Dong Liu, and Jingdong Wang. Deep high-resolution representation learning for human pose estimation. In CVPR, 2019.

16—Wongun Choi, Khuram Shahid, and Silvio Savarese. What are they doing?: Collective activity classification using spatio-temporal relationship among people. In ICCV Workshops, 2009.

The invention claimed is:

1. A method for processing visual data for individual and group activities and interactions, the method comprising:

receiving a single raw video of a scene showing one or more entities over a given time;

obtaining a training set comprising at least one labeled individual or group activity;

training at least one machine learning or artificial intelligence technique using the obtained at least one labeled individual or group activity in the training set to directly process the received single raw video by automatically representing spatial, temporal or spatio-temporal content of the visual data of the received single raw video and numerically modelling temporally static and temporally dynamic features of each of the one or more entities in the single raw video by generating numerical representations capturing the temporally static and temporally dynamic features;

inferring at least one individual or group activity based on the generated numerical representations; and localizing the at least one individual or group activity in space and time in a plurality of images of the single raw video.

2. The method of claim 1, further comprising:

applying trained machine learning and artificial models to the visual data;

identifying individual and group activities by analyzing the generated numerical representation for the spatial, temporal, or spatio-temporal content of the visual data; and outputting at least one label to categorize an individual or a group activity in the visual data.

3. The method of claim 1 further comprising using at least one spatial attribute of the entities for representing temporally static or dynamic information of the visual data.

4. The method of claim 3, wherein the spatial attribute of a human entity comprises body pose information on one single image as a static representation, or body pose information on a plurality of image frames in a video as a dynamic representation.

5. The method of claim 1, wherein the numerical representations comprise a numerical representative feature vector in a high dimensional space for a static and dynamic modality.

6. The method of claim 1, wherein the spatial content corresponds to a position of the entities in the scene at a given time with respect to a predefined coordinate system.

7. The method of claim 1, wherein the activities are human actions, human-human interactions, human-object interactions, or object-object interactions.

8. The method of claim 7, wherein the visual data corresponds to a sport event, humans correspond to sport players and sport officials, objects correspond to balls or pucks used in the sport event, and the activities and interactions are players' actions during the sport event.

9. The method of claim 8, where the visual data collected from the sport event is used for sport analytics applications.

10. The method of claim 1, further comprising identifying and localizing a key actor in a group activity, wherein a key actor corresponds to an entity carrying out a main action characterizing the group activity that has been identified.

11. A non-transitory computer readable medium storing computer executable instructions for processing visual data for individual and group activities and interactions, comprising instructions for:

receiving a single raw video of a scene showing one or more entities over a given time;

obtaining a training set comprising at least one labeled individual or group activity;

training at least one machine learning or artificial intelligence technique using the obtained at least one labeled individual or group activity in the training set to directly process the received single raw video by automatically representing spatial, temporal or spatio-temporal content of the visual data of the received single raw video and numerically modelling temporally static and temporally dynamic features of each of the one or more entities in the single raw video by generating numerical representations capturing the temporally static and temporally dynamic features;

inferring at least one individual or group activity based on the generated numerical representations; and localizing the at least one individual or group activity in space and time in a plurality of images of the single raw video.

12. A device configured to process visual data for individual and group activities and interactions, the device comprising a processor and memory, the memory storing computer executable instructions that, when executed by the processor, cause the device to:

receive a single raw video of a scene showing one or more entities over a given time;

obtain a training set comprising at least one labeled individual or group activity;

train at least one machine learning or artificial intelligence technique using the obtained at least one labeled individual or group activity in the training set to directly process the received single raw video by automatically representing spatial, temporal or spatio-temporal content of the visual data of the received single raw video and numerically modelling temporally static and temporally dynamic features of each of the one or more entities in the single raw video by generating numerical representations capturing the temporally static and temporally dynamic features;

infer at least one individual or group activity based on the generated numerical representations; and localize the at least one individual or group activity in space and time in a plurality of images of the single raw video.

13. The device of claim 12, further comprising computer executable instructions to:

apply trained machine learning and artificial models to the visual data;

identify individual and group activities by analyzing the generated numerical representation for the spatial, temporal, or spatio-temporal content of the visual data; and output at least one label to categorize an individual or a group activity in the visual data.

14. The device of claim 12 further configured to use at least one spatial attribute of the entities for representing temporally static or dynamic information of the visual data.

15. The device of claim 14, wherein the spatial attribute of a human entity comprises body pose information on one single image as a static representation, or body pose information on a plurality of image frames in a video as a dynamic representation.

16. The device of claim 12, further comprising instructions to identify and localize a key actor in a group activity, wherein a key actor corresponds to an entity carrying out a main action characterizing the group activity that has been identified.

17. The method of claim 1, wherein the temporally static and temporally dynamic features are fused before being processed with a transformer of a model resulting from the learning, or after classification of the temporally static and temporally dynamic features by a classifier of the model.

18. The method of claim 1, wherein inferring the at least one individual or group activity further comprising:

passing the generated numerical representations through a self-attention mechanism to obtain action-level features;

combining and pooling the action-level features to capture group activity-level features; and using a classifier to infer individual actions and group activities using the action-level and group activity-level features.

19. The method of claim 18, wherein the self-attention mechanism is a multi-head attention feature that:

processes the generated numerical representations to determine a further numerical representation, wherein the self-attention mechanism uses a weighted sum of all of the generated numerical representations to give more importance to more relevant observations to arrive at the further numerical representation, and wherein the weighted sum is based on processing the generated numerical representations with a matching function to determine the further numerical representation.

20. The device of claim 12, further configured to:

pass the generated numerical representations through a self-attention mechanism to obtain action-level features;

combine and pool the action-level features to capture group activity-level features; and use a classifier to infer individual actions and group activities using the action-level and group activity-level features.

* * * * *